United States Patent [19]

Müller

[11] 4,236,310
[45] Dec. 2, 1980

[54] PORTABLE WORKING IMPLEMENT

[75] Inventor: Erich Müller, Waiblingen, Fed. Rep. of Germany

[73] Assignee: Andreas Stihl, Waillengen, Fed. Rep. of Germany

[21] Appl. No.: 945,635

[22] Filed: Sep. 25, 1978

[30] Foreign Application Priority Data

Sep. 24, 1977 [DE] Fed. Rep. of Germany ....... 2743043

[51] Int. Cl.³ .................. A01D 55/18; B27B 17/02
[52] U.S. Cl. .......................... 30/276; 30/381
[58] Field of Search ............ 403/5; 30/381, 276, 30/296 R, 296 A; 285/DIG. 1, 49; 248/562; 56/12.7

[56] References Cited

U.S. PATENT DOCUMENTS

| 3,430,343 | 3/1969 | Ishizaki | 30/276 |
| 3,658,314 | 4/1972 | Luzsicza | 248/562 X |
| 3,781,991 | 1/1974 | Stretton | 30/276 |
| 4,135,301 | 1/1979 | Hoeppner | 30/381 |

FOREIGN PATENT DOCUMENTS 1048123 11/1966 United Kingdom ................ 273/81 R Primary Examiner—Jimmy C. Peters
Attorney, Agent, or Firm—Becker & Becker, Inc.

[57] ABSTRACT

A portable motor driven working implement for agriculture and forestry, especially brushcutter, which includes a first implement part subjected to vibrations which through the interposition of at least one elastic insulating element is connected to a second implement part on the side of a handle of the implement, the rigidity characteristic of the insulating element being adjustable.

19 Claims, 21 Drawing Figures

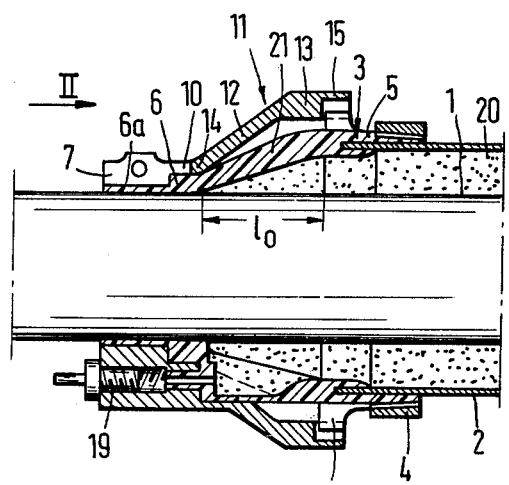
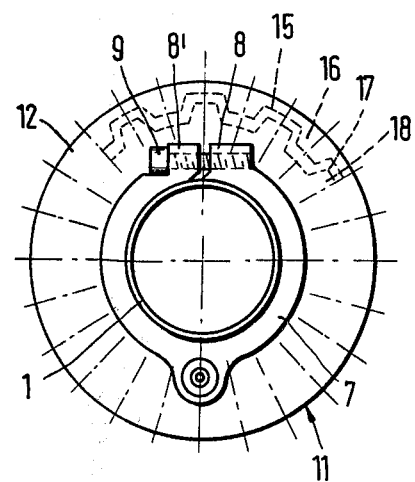
Fig.1A    Fig.2
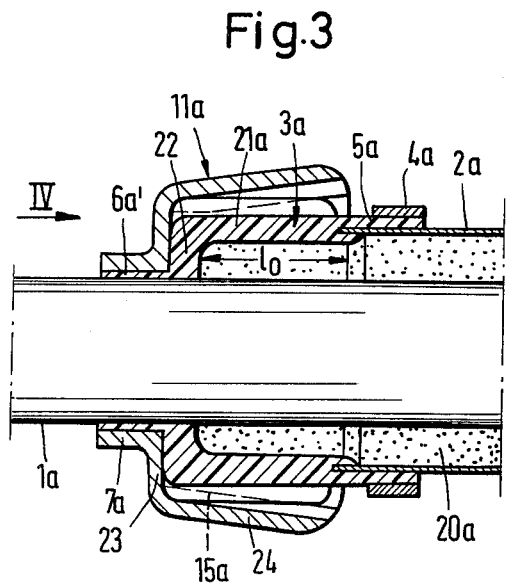
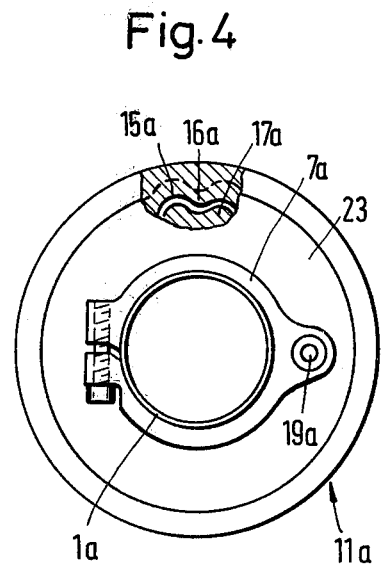
Fig.3    Fig.4

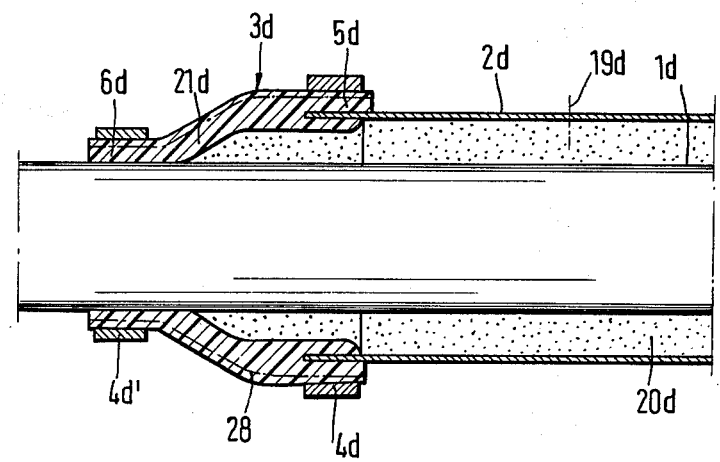
Fig.7
Fig.8
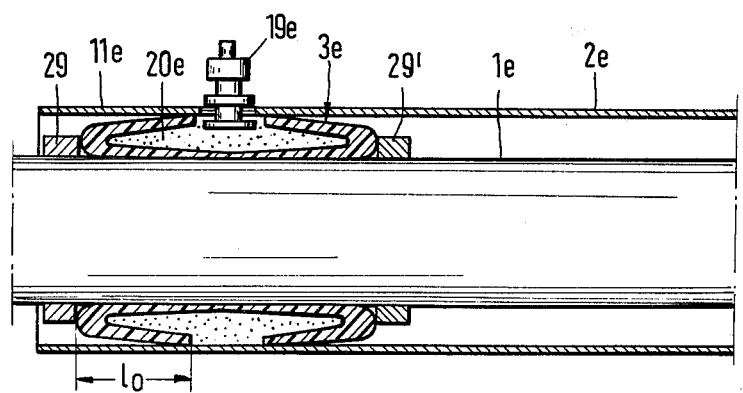

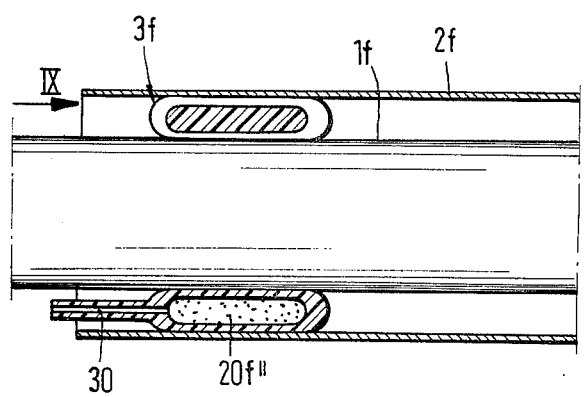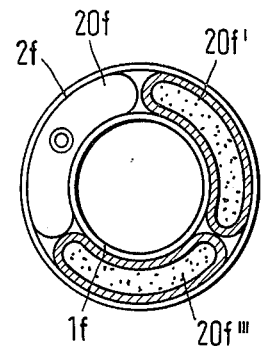
Fig.9  Fig.9A
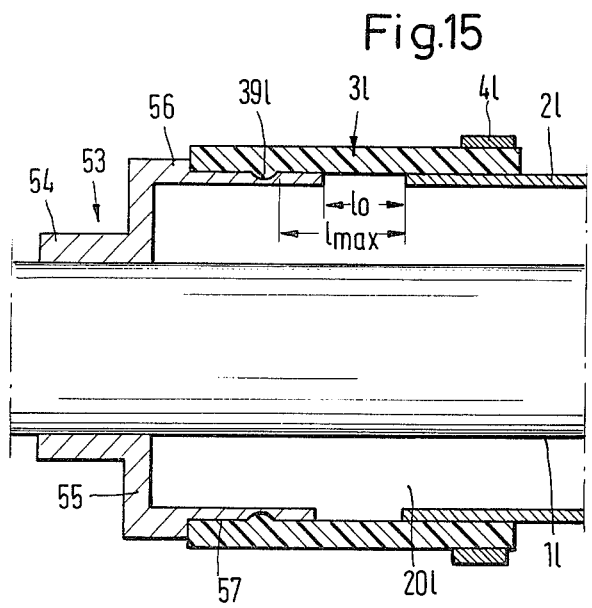
Fig.15

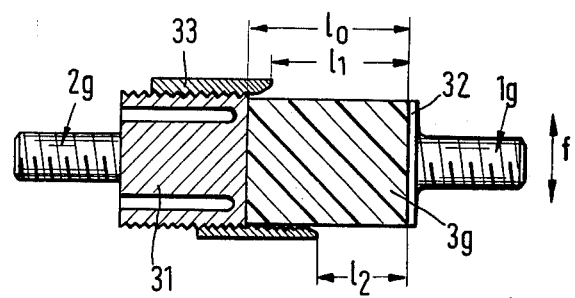
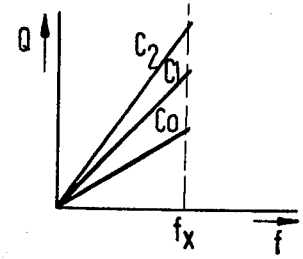
Fig.10B  Fig.11
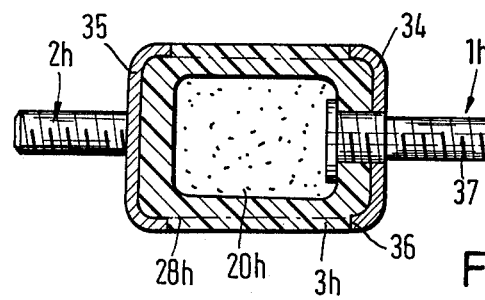
Fig.12
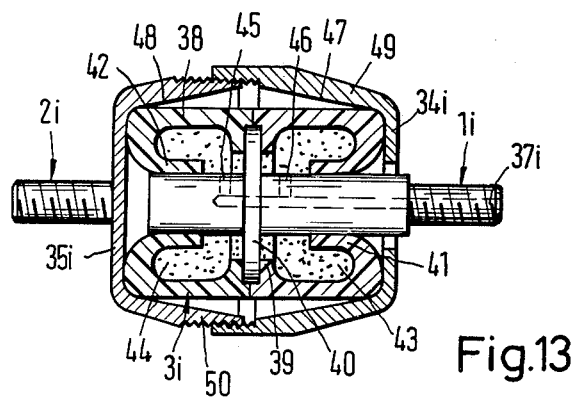
Fig.13
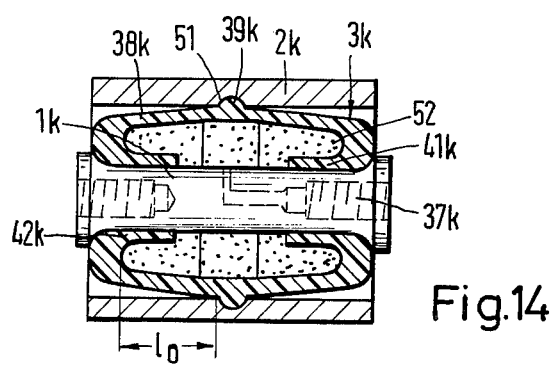
Fig.14

PORTABLE WORKING IMPLEMENT

The present invention relates to a portable working implement, especially a combustion engine driven working implement for agriculture and forestry, for instance a brushcutter which is provided with an implement part subjected to vibrations and which through the interposition of at least one elastic insulating element is connected to an implement part on the handle side.

With brushcutters it is known, for instance, to mount the implement part located on the handle side and designed as pipe section through the interposition of an insulating element of rubber on the implement part which is designed as a pipe section and is subjected to vibrations. At the upper end of the implement part subjected to vibrations there is provided the drive motor which through a shaft guided in the implement part subjected to vibrations is adapted to drive a cutting tool provided at the lower end of the implement part subjected to vibrations. The implement part provided at the handle side has one end connected to the motor housing, whereas the other end has arranged thereon the rubber insulating element. On the implement part located at the handle side there is arranged a guiding element with two handles for carrying the brushcutter.

The insulating element consisting of rubber material insulates the vibrations of the implement part subjected to vibrations so that the guiding element on which the brushcutter is carried is subjected only slightly to vibrations. The rubber element provided for the insulation has a uniform stiffness characteristic. The stiffness or rigidity is uniform regardless of whether the brushcutter is used for cutting thick trunks having a diameter of for instance 10 to 15 cm, or whether it is being used for cutting grass. The rigidity selected in conformity with the cutting of trunks will then be too high for the cutting of grass. For the cutting of grass, a considerably lower guiding rigidity would suffice. The insulation brought about by the rubber elements is temperature dependent to a high degree. When it is cold, the rubber elements are particularly stiff and thus yield poor insulating values. The vibrations produced by the implement part subjected to vibrations are in such an instance practically not insulated and are in their entirety conveyed to the implement part on the handle side. As a result thereof, a precise guiding of the brushcutter and thus a safe operation is not possible. In addition thereto, the human organism is in cold weather more sensitive to vibrations than at normal temperatures so that the undamped vibrations are particularly critical.

It is, therefore, an object of the present invention to provide a portable working implement of the above mentioned general type according to which in a simple manner the rigidity characteristic of the rubber elements can be selected in conformity with the respective operations to be carried out.

This object and other objects and advantages of the invention will appear more clearly from the following specification in connection with the accompanying drawings, in which:

FIG. 1a represents a longitudinal section through a portion of the working implement of FIG. 1.

FIG. 2 illustrates a view in the direction of the arrow II in FIG. 1a.

FIGS. 3 and 4 respectively illustrate in longitudinal section and in end view a second embodiment of a working implement according to the invention.

FIGS. 5 to 8 represent illustrations similar to FIG. 1a while showing further embodiments of a working implement according to the invention.

FIGS. 9 and 9a illustrate similar to FIGS. 1a and 2 still another embodiment of the working implement according to the invention.

Figure 10:
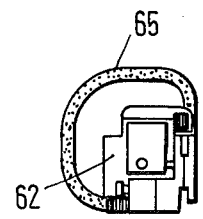

FIG. 10 diagrammatically illustrates still another embodiment of a working implement of the invention.

Figure 10A:
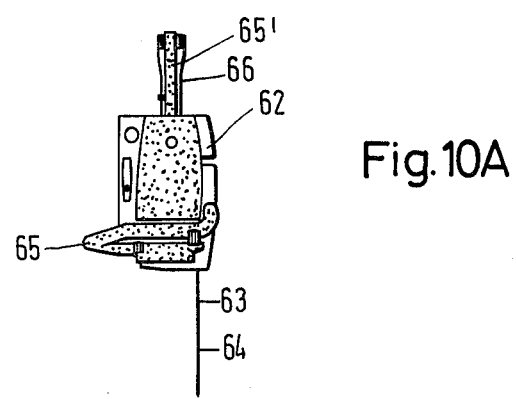

FIG. 10A is a top view of the implement of FIG. 10.

FIG. 10B represents a longitudinal section through a portion of the working implement according to FIGS. 10 and 10A.

FIG. 11 illustrates by way of a diagram the interdependence of the shear resistance and the spring length of the insulating element.

FIGS. 12-15 show further embodiments of the working implement according to the invention in an illustration similar to that of FIG. 1A.

Figure 16:
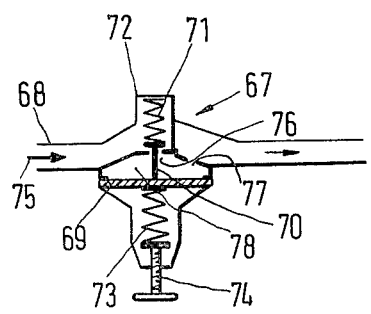

FIG. 16 diagrammatically illustrates a pressure reducing valve for adjusting the insulating characteristic of the insulating element.

Figure 17:
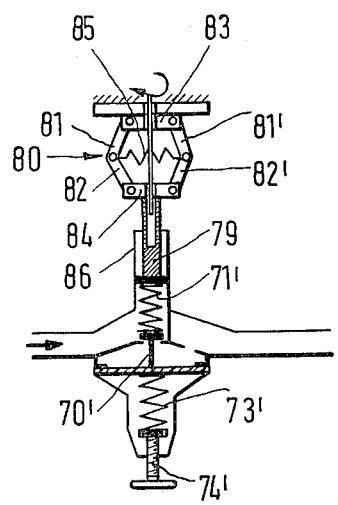

FIG. 17 shows a second embodiment of a pressure reducing valve.

The portable working implement according to the present invention is characterized primarily in that the rigidity characteristic of the insulating element is adjustable. Depending on the adjusted rigidity characteristic, the vibrations generated by the drive motor and the implement are to a greater or lesser degree transmitted through the implement part subjected to vibrations onto the implement part on the handle side. If, for instance, grass is to be cut with the implement according to the invention, the rigidity may be low because the implement part subjected to vibrations is in such an instance subjected to minor vibrations only. If, however, the brushcutter is intended to cut through trunks, the rigidity is set to higher values so that the precise guiding of the implement will be assured which is necessary for a safe operation. In view of the adjustability of the rigidity characteristic, the insulating element may be adapted in an optimum manner to any operation to be carried out. The rigidity can be so adjusted in conformity with the respective purpose that the working implement can easily be guided and that the unavoidable vibrations will to a satisfactory degree be absorbed by the insulating element. It is possible with the implement according to the invention also to safely operate at low temperatures because the rigidity can be set for such values at which satisfactory insulating values are obtained. In view of the design according to the invention a working implement has been created which by means of a single insulating element can be used for various different operations and which will allow a safe guiding and an accident-free operation.

Referring now to the drawings in detail, the working implements illustrated in FIGS. 1-9A represent brush cutters having an implement part 1 which is acted upon by vibrations and is designed as a tube or pipe with circular cross section. Arranged at the upper end of said pipe in a motor housing is a drive motor 60 which through a non-illustrated driving shaft extending through pipe 1 is drivingly connected to a cutting device 61 arranged at the lower end of pipe 1. Within the upper region of pipe 1, the pipe is surrounded in spaced relationship thereto by an implement part 2 arranged on the handle side. The implement part 2 is formed by a pipe section with circular cross section. The pipe section 2 has its two ends respectively inserted into sleeves 3 (FIG. 1A), one sleeve only being shown in FIG. 1A. The sleeves 3 advantageously are rubber sleeves and form insulation elements. That part of each sleeve 3 which rests on the outside of pipe 2 and which in axial direction of the pipe section projects beyond the sleeve section engaging the inner wall of pipe 2 is clamped fast upon the pipe section 2 by means of a clamping ring 4. For purposes of obtaining a high clamping effect, the clamping surfaces of the clamping ring 4 and of the sleeve section resting on the outside of the pipe section 2 are conical as has been clearly shown in FIG. 1A.

The sleeve 3 is substantially truncated cone shaped and at both ends merges with a cylindrical section 5 and 6. The cylindrical section 5 comprises a sleeve section which engages the outside and inside of the pipe section 2. The other cylindrical section 6 rests upon the pipe section 2 and is provided with an end 6a having its outer diameter reduced. Connected to the end 6a is a clamping strap 7 having both enlarged ends 8,8' thereof provided with threaded bores for engagement with a threaded bolt 9 by means of which the clamping strap 7 through the interposition of the cylindrical end 6a of the sleeve section 3 can be clamped onto the pipe 1. Within the region of the two ends 8,8', an extension 10 of the clamping strap 7 extends over that portion of the sleeve 6 which has the larger diameter. The clamping strap 7 forms a part of an abutment member 11 which extends over a portion of the axial length of sleeve 3. The abutment member 11 has a substantially truncated cone shaped central portion 12 which at both ends merges with cylindrical end sections 13 and 14. By means of the cylindrical end section 14, the abutment member 11 rests on the end section 6 of the sleeve 3. The other end section 13 which has a greater thickness than the end section 14 is provided with gearing 15 (FIG. 2) which comprises teeth 16 of trapezoidal cross section, said teeth extending radially inwardly. Provided on the cylindrical section 5 of the sleeve 3 are corresponding outer gearing 17 comprising teeth 18 uniformly distributed over the circumference and likewise having a trapezoidal cross section. The teeth 16 and 18 of the two gearings 15 and 17 mesh with each other with play on all sides.

Figure 1:
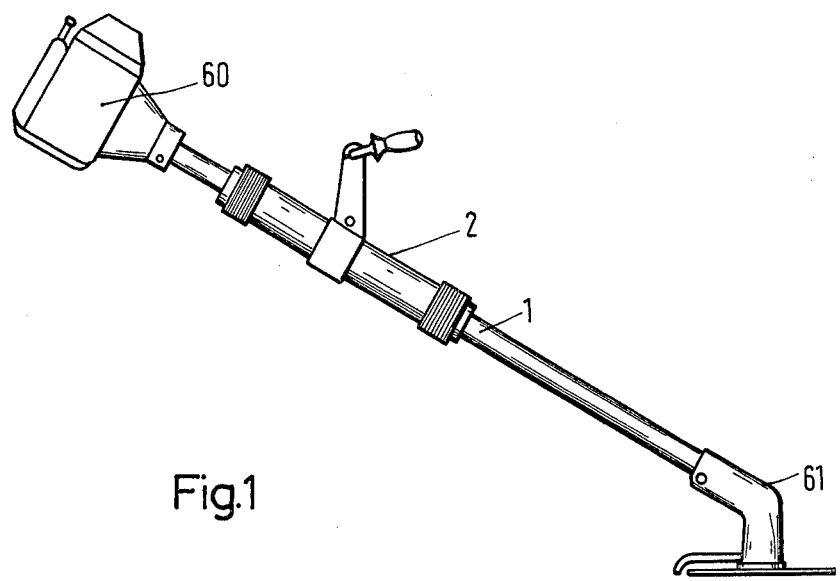
FIG. 1 illustrates a side view of a first embodiment of a working implement according to the invention.

Diametrically oppositely located to the ends 8, 8' of the clamping strap 7 is an inlet and outlet valve 19 which is mounted in the clamping strap 7 and in the abutment part 11. The valve 19 leads into a hollow chamber 20 which is confined by the pipe 1 and the pipe section 2 as well as by the two sleeves 3. FIG. 1 shows only one end of the pipe section 2. The other end of the pipe section is correspondingly designed forming an image thereto.

When working with the brush cutter, the motor 60 and the cutting device 61 transfer vibrations to the pipe 1 and from there onto the pipe section 2. In order to insulate these vibrations, the pipe section 2 is with the two sleeves 3 and with the elastic cushion which is generated by the medium provided in the hollow chamber 20 is mounted so as to be insulated with regard to vibrations relative to the pipe 1, which is subjected to vibrations.

In the position of sleeve 3 as shown in FIG. 1, the pipe section 2 is particularly softly mounted with regard to pipe 1. In this instance the sleeve 3 engages the cylinder end section 14 of the abutment part 11 by means of its cylindrical section 6. The conically extending intermediate section 21 of the sleeve 3 which in the direction toward the end section 5 gradually increases in thickness, and the end sections 5 are spaced from the conical intermediate section 12 and from the cylindrical end section 13 of the abutment part 11. This distance increases from the contact area on the sleeve end 6. Due to this distance from the sleeve part comprising the abutment part 11, a length $l_o$ is determined which is not supported in radial direction and which is responsible for the height of the rigidity. The diagram of FIG. 11 illustrates the interdependency of the transverse force Q and the deviation or deflection F. The straight line $c_o$ illustrated in the diagram corresponds to the length $l_o$. Illustrated in the diagram at this value $l_o$, the transverse force is lowest. The rigidity is very soft in this instance. Such slight guiding stiffness will suffice for instance for grass cutting with the brush cutter according to the invention.

Such slight rigidity, however, is totally insufficient for sawing through trunks or branches because in such instances the strong vibrations occurring in connection with the sawing action would be transmitted to the pipe section 2 in their entirety and thereby also to the handle. An exact guiding of the working implement no longer would be assured under such circumstances and a considerable danger of accident would exist. In view of the design according to the invention, the rigidity characteristic can be varied. To this end, the hollow chamber 20 is through valve 19 filled with a pressure medium for instance air, oil, or the like. The pressure medium will in hollow chamber 20 build up a pressure whereby the truncated cone shaped central portion 21 will be pressed outwardly and will engage the inner wall of the truncated cone shaped central portion 12 of the abutment 11. As a result thereof, the non-supported length will be reduced. Accordingly, the transverse force will increase, which means the rigidity, as shown in the diagram of FIG. 11. The rigidity will thus become harder so that a better guiding of the working implement will be assured. Maximum insulation will be obtained when the central portion 21 of the sleeve 3 over the length $l_o$ (FIG. 1) completely engages the abutment part 11. In this instance, no non-supported sleeve section exists so that a so-to-speak rigid connection of the pipe section 2 with the pipe 1 is obtained. With the aid of such a hard rigidity, the working implement according to the invention can for instance be employed for cutting down small trees or for cutting off stronger branches in a proper manner. The sleeve 3 comprises a suitable material which will permit such an elastic deformation. Of course, the sleeve is by means of the clamping strap 7 and the clamping ring 4 sealingly connected to the pipe 1 and pipe section 2 so that no pressure medium can escape from the hollow chamber 20 to the outside. The inner gearing 15 of the abutment part 11 forms a torsion abutment for the outer gearing 17 of the sleeve 3. As a result thereof, also in the circumferential direction of the pipe section 2 and pipe 1 a precise guiding will be assured. Inasmuch as the teeth 16 and 18 of the two gearings 15 and 17 mesh with each other with play on all sides, also in circumferential direction a certain insulation will be assured.

If again a softer insulation is desired, it is merely necessary to open the valve 19 so that the pressure medium can escape from the hollow chamber 20 toward the outside.

According to the embodiment of FIGS. 3 and 4, the sleeve 3a has its central section 21a designed cylindrical and has a constant thickness within this region. The pipe section 2a similar to the preceding embodiment engages the sleeve 3a while the longer portion of the end section 5a which longer portion rests on the outside of the pipe section 2a is clamped fast to the clamping ring 4a on pipe 2a. At the other end, the cylindrical central portion 21 merges at a right angle with a bottom 22 which confines the hollow chamber 20a between the pipe 1a and the pipe section 2a in axial direction. The sleeve 3a rests with a cylindrical end section 6a' on pipe 1a and follows the bottom 22 at a right angle. The said end section 6a' has a considerably thinner thickness than the remaining sleeve part. Similar to the preceding embodiment, the sleeve 3a is connected to the pipe 1a by means of the clamping strap 7a. The clamping strap 7a rests on the cylindrical end section 6a' of the sleeve. The clamping strap 7a forms a part of the abutment part 11a which through a flangelike intermediate member which extends perpendicular to the clamping strap 7a follows the clamping strap. The intermediate member 23 engages that outside of the sleeve bottom 22 which faces away from the hollow chamber 20a and merges with a section 24 which in the direction toward the pipe section 2a widens conically. The section 24 ends in spaced relationship to the clamping ring 4a.

While with the embodiment according to FIGS. 1A and 2, the inner gearing 15 is provided only at the end of the cylindrical section 13 of the abutment part 11, it will be appreciated that according to the embodiment of FIGS. 3 and 4, the inner gearing 15a is provided over the entire length of the conical section 24. As indicated in FIG. 4, the inner gearing is undulated so that the teeth 16a and the depressions located therebetween have a partial circular contour. Correspondingly, the outer gearing 17a of the sleeve has an undulated cross section. The rib shaped teeth 18a of the outer gearing 17a have a length corresponding to that of the rib-shaped teeth 16a of the abutment part 11a.

In the position occupied by the sleeve 3a as shown in FIG. 3, a soft stiffness or rigidity is obtained because the sleeve is not supported over the maximum possible length $l_o$ on the abutment part 11a. In order to obtain a greater stiffness, the hollow chamber 20a is filled through the valve 19a arranged on the clamping strap 7a with the pressure medium, preferably air. The cylindrical intermediate section 21a of the sleeve 3a will then, starting from the bottom 22, more or less engage the abutment part 11a in conformity with the pressure prevailing in the hollow chamber 20a, as a result of which the free non-supported length of the sleeve will decrease steadily until the sleeve finally completely engages the abutment part 11a. As a result thereof, a maximum insulation and thereby the maximum stiffness is obtained. With this embodiment, the sleeve engages the abutment part through the gear rings 15a and 17a so that with increasing pressure in the hollow chamber 20a a positive torsional movement is obtained. As a result therof, the pipe section 2a will in axial direction as well as in circumferential direction for all practical purposes be rigidly connected to the pipe 1a so that the implement can be guided safely and precisely.

With the two above described embodiments, the sleeves 3, 3a are so designed that also in a pressure-less condition of the hollow chamber it is possible to work with the implement. It is without difficulty possible to mount a pump unit in the motor housing or on the motor housing so that it will be possible on the spot during operation of the implement to vary the stiffness or rigidity characteristic of the insulating element 3, 3a. It is expedient to axially displaceably mount the abutment part on the pipe section which is subjected to vibrations. In such an instance it is possible, in case of a failure of the pump unit, to adjust the abutment part manually in axial direction toward the sleeve so that as a result thereof a change of the free non-supported length of the sleeve and thus a corresponding change in the stiffness can be realized. Inasmuch as the hollow chamber annularly surrounds the pipe section subjected to vibrations, it will be appreciated that the same insulating values are obtained over the circumference of the pipe 1, 1a.

Figure 5:
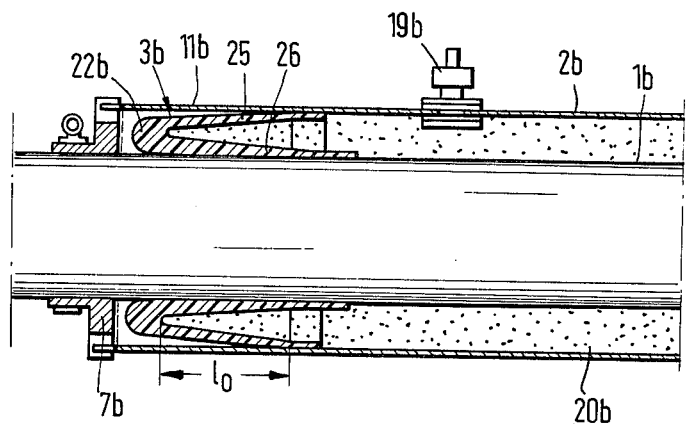

According to the embodiment of FIG. 5, the sleeve 3 is arranged over its entire length within the chamber between the pipe section 2b and the pipe 1b. The pipe section 2b has its ends respectively held on pipe 1b by clamping straps 7b. The sleeve 3b has an about V-shaped cross section with two legs 25, 26 which diverge in the direction toward the respective oppositely located end of the pipe section 2b. The two legs 25, 26 taper in the direction toward their free ends. The bottom 22 of the sleeve which bottom faces the clamping strap 7b is considerably thicker than the two legs and is located in slightly spaced relationship to the adjustment clamping strap. The sleeve has its cylindrical mantle 26 over the entire mantle length resting on the pipe 1b, whereas the other cylindrical mantle of leg 25 engages the inner wall of the pipe section 2b only within the region of its free end. The spacing from the inner wall of the pipe section increases for the remaining portion of the cylinder mantle of the leg 25 in the direction toward the bottom 22b. The two mantle parts of the legs 25, 26 are in a suitable manner firmly pressed against the pipe or the pipe section so that the pressure medium in the hollow chamber 20 between the pipe and the pipe section cannot escape toward the outside within the region of the sleeve. In the pipe section 2b there is provided a valve 19b by means of which the hollow chamber can be filled with a pressure medium.

With the sleeve 3b occupying its FIG. 5 position, the pipe section 2b is with little insulation located on the pipe 1b.

The free non-supported length $l_o$, in other words the free thrust length, of the outer cylinder mantle of the leg 25 has its maximum value. When the hollow chamber 20b is filled with a pressure medium, the outer cylindrical mantle of leg 25 will, in view of the exerted pressure, depending on the magnitude of the pressure, engage to a more or less degree the inner wall of the pipe section 2b whereby the free thrust length is reduced. Accordingly, the stiffness will increase which means that the insulation becomes greater. When the outer cylindrical mantle of the leg 25 engages the inner wall of the pipe section 2b over the entire length $l_o$, the maximum insulation value is obtained. With this embodiment, the end 11b of the pipe section 2b serves as abutment part so that, in contrast to the above described embodiments, no additional additional structural element is necessary. Inasmuch as the sleeve is arranged completely within the pipe section 2b, the effective outer diameter in this region is considerably less than with the previously described embodiments.

Figure 6:
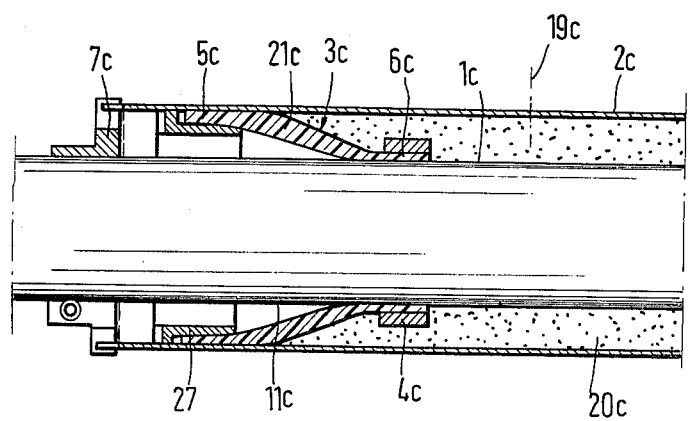

Also with the embodiment of FIG. 6 the sleeve 3c is arranged in the region between the pipe section 2c and the pipe 1c and confines the hollow chamber 20c in axial direction which hollow chamber is located between the pipe section and the pipe. The sleeve has a conical central portion 21c which at both ends merges with the cylindrical section 5c and 6c. The pipe section 2c is at both ends, in conformity with the embodiment of FIG. 5, respectively held on the pipe 1c by clamping straps 7c. The cylindrical section 6c of the sleeve which faces away from the adjacent clamping strap 7c is by means of a clamping ring 14 firmly clamped onto the pipe 1c. The other cylindrical section 5c is clamped fast between the inner wall of the pipe section 2c and a ring 27. The ring 27 is connected to the inner wall of the pipe section. The ring 27 is located in spaced relationship to the adjacent clamping strap 7c. The conical part 21c of the sleeve tapers from the cylindrical section 5c in the direction toward the other cylindrical section 6c. In the position illustrated in FIG. 6, the conical central part 21c is spaced over its entire length from the outer wall of the pipe 1c. As a result thereof, a lesser insulation of the vibrations between the pipe section 2c and the pipe 1c is obtained. In conformity with the previously described embodiments, the pressure medium may be introduced through valve 19c which is located in the pipe section 2c. According to the pressure prevailing in the hollow chamber, the conical central portion 21c will gradually engage the outside of pipe 1c whereby the free thrust length is reduced and to the same extent the stiffness is increased. With the engagement of the central portion 21c of the sleeve, the sleeve is elastically deformed while, due to the increasing thickness of the central section in the direction toward the cylindrical section 5c, an ever increasing force acts against the elastic deformation with decreasing free thrust length. As a result thereof, a very high stiffness can be realized so that the implement can be employed without difficulties also for cutting down trees or the like without increasing the danger of accidents.

Also with the embodiments of FIGS. 1A, 2 and 5, the advantageous effect is obtained in view of the increase in cross section of the sleeve section engaging the abutment part. With the embodiment of FIG. 6, the abutment part 11c engaged by the sleeve section 21c is formed by a portion of the outside of the pipe 1b. As a result thereof, also in this instance no separate abutment part is necessary so that the construction of the implement is very simple.

The sleeve 3d of FIG. 7 has a conical central portion 21d which follows the cylindrical sections 5d and 6d. The two ends of the pipe section 2d are inserted into the cylindrical sleeve part 5d. The cylindrical sleeve part 5d is by means of a clamping ring 4d firmly pressed upon the pipe section 2d, while the other cylindrical mantle section 6d is firmly pressed upon pipe 1d by means of another clamping ring 4d'. According to the preceding embodiments, a sleeve is clamped fast onto both ends of the pipe section 2d. Within the region between the pipe section 2d, the pipe 1d and the two sleeves 3d, the hollow chamber 20d is arranged for receiving the pressure medium.

The sleeve 3d' is within the region of its outside reinforced by a carcass-like fabric 28 which in embedded in the sleeve and which extends over the entire axial length and the entire circumference of the sleeve. With this embodiment, the stiffness is varied by the fabric 28 and by the variable pressure in the hollow chamber 20d. In contrast to the previous embodiments, the free thrust length is not changed, but the stiffness is affected by the reinforcing fabric 28 in the sleeve and by the pressure in the hollow chamber 20d. For supplying the pressure medium, the pipe section 2d is provided with a valve 19d.

With the embodiment of FIG. 8, the air cushion is provided completely within the sleeve 3e. The sleeve is designed as a wider flat hose which surrounds the pipe 1e and is arranged between the pipe section 2e and the pipe 1e. The hollow chamber 20e is thus surrounded completely by the sleeve 3e. The sleeve has its inner mantle completely resting on the pipe 1e. The outer mantle surface has a conical cross section and engages at half the length the inner wall of the pipe section 2e and from there on is spaced from the pipe section by a distance which increases in axial direction. The sleeve is axially secured by means of two rings 29, 29' which are directly connected to the pipe 2e.

With this embodiment, the stiffness is again obtained by varying the free thrust length $l_o$. To this end, the pressure medium is introduced into the hollow chamber 20e through the valve 19e, which is held in the pipe section 2e and leads into the hollow chamber 20e. In conformity with this pressure the outer mantle of the sleeve engages the inner wall of the pipe section 2e and thereby decreases the free thrust length. The abutment part 11e is thus formed by the end of the pipe section 2e. At both ends of the pipe section 2e there are respectively provided such hose-shaped sleeves. These two sleeves may be inflated to a different degree so that at both ends of the pipe section different insulating values are obtained. As a result thereof, an optimum adaptation to the respective working conditions is assured.

According to the embodiments of FIGS. 1–7, the sleeves at the two pipe sections may consist of different elastic material so that also in this instance different insulating values can be adjusted at the two pipe sections. Moreover, with these embodiments, it is possible to adjust the free thrust length at both pipe sections to a different degree so that at both pipe section ends different stiffness values and this different insulating values will be obtained.

With the embodiments of FIGS. 1–6 and 8, the free thrust length is varied by the pressure medium enclosed in the hollow chamber. According to the embodiment of FIG. 8, the pressure medium enclosed in the hollow chamber 20e acts as an additional spring which contributes to an increased insulation. According to the embodiment of FIG. 7, the change in the stiffness is likewise effected by the pressure medium enclosed in the hollow chamber 20b.

The sleeve 2f according to FIG. 6 is likewise arranged between the pipe section 2f and the pipe 1f. In the sleeve 3f, according to FIG. 9A, three hollow chambers 20F, 20F' and 20F" are provided which are uniformly distributed about the pipe 1f and which, when viewed in axial direction of the pipe 1f, respectively extend over an arc angle of about 120°. The walls of the hollow chambers are located adjacent to each other and are interconnected. The ends of the walls of the hollow chambers which ends are located in circumferential direction and in axial direction are in radial section (FIG. 9A) and in axial section (FIG. 9) curved about semi-circularly. Each hollow chamber has a feeding line 30 for the pressure medium so that the hollow chambers can be subjected to different pressures. As a result thereof, different insulating values and stiffnesses can be set over the circumference of the pipe 1f. Furthermore, the hollow chambers in both sleeves can at the pipe sections be subjected to different pressures so that a precise adaptation to the respective working operation to be accomplished is possible. The stiffness changes in conformity with the pressure in the hollow chambers of the sleeve.

According to the embodiments of FIGS. 1 and 9A, it is expedient when the pipe section together with the pertaining sleeves can be displaced axially upon the pipe. As a result thereof, it will be possible so to arrange the connecting points, in other words the sleeves, or the pipe section on the pipe that the sleeves will be located in the vibration nodes of the pipe. As a result thereof, the occurring vibrations will be minor from the start so that only a slight insulation has to be effected. Inasmuch as the pipe section together with the sleeves is not connected with the motor housing at the upper end of the pipe, the pipe section can with the sleeves also later be mounted on the pipe so that working implements already in use can later on be provided with the implement according to the invention. The displaceability of the pipe section on the pipe furthermore has the advantage that the working implement can be precisely adjusted in conformity with the skill of the operator without running the risk that the insulating values will decrease. The pipe section may also be designed telescopically, which means may comprise at least two sections which are placed within each other and are displaceable relative to each other. Also in such an instance the pipe section can be displaced on the pipe in such a way that the sleeves are located in the vibration nodes of the pipe.

The embodiments according to FIGS. 1–9A are particularly suited for brushcutters. The embodiments according to FIGS. 10–14 to be described are used advantageously for separating grinders, chain saws, and the like, as they are illustrated in FIGS. 10 and 10A. The motor chain saw illustrated in these figures has a drive motor 62 which is mounted in a housing and which drives a saw chain 64 circulating on a tongue (Schwert) 63. Within the region of the saw chain there is provided the handle 65 which with both ends is connected to the motor housing through the intervention of an insulating element each according to FIGS. 10B–15. The handle end is mounted on the side wall of the motor housing from where the handle extends upwardly beyond the motor housing and with its other end is connected to the motor housing. The back side of the motor housing which faces away from the saw chain has connected thereto a further handle 65' which is yoke-shaped and has its ends respectively through the interposition of an insulating element connected to the motor housing and to a carrier 66 which is connected to the motor housing.

With the embodiment of FIG. 10B, the implement part 2g at the handle side is through the insulating element 3g connected to an implement part 1g which is subjected to vibrations by the motor. The insulating element 3a consists throughout of rubber or a similar insulating material. The implement part 2g to which the handle of the implement is connected has a cylindrical part 31 having the insulating element 3g connected to one of its end faces. The implement part 1g has a flange 32 to which the insulating element 3g is connected. The two handle parts 1g and 2g are braced against each other in a non-illustrated manner. For changing the stiffness of the insulating element 3a, a bushing 33 is screwed onto the cylindrical part 31 of the implement part 3g. The bushing 33 can be partially screwed over the insulating element 3g as shown in the lower portion of FIG. 10. When the bushing 33 has been screwed back completely, in other words the insulating element 3g no longer projects, a free thrust length $l_o$ is obtained which corresponds to the axial length of the insulating element. When the bushing 33 is screwed over the insulating element, the free thrust length decreases from $L_1$ to $L_2$. As shown in FIG. 11, depending on the length of the free thrust length, the stiffness Q is changed. The straight lines $c_o$, $c_1$ and $c_2$ are coordinated with the thrust lengths $l_o$, $l_1$ and $l_2$. The shorter the thrust length, the greater will be the stiffness Q with a predetermined deflection f. This deflection is effected transverse to the axial direction of the implement parts 1g, 2g and of the insulating element 3g as shown in FIG. 10.

With the embodiment of FIG. 12, the implement part 2h at the handle side and the implement part 1h subjected to vibrations are interconnected by the insulating element 3h which is cylindrical. The two implement parts 1h and 2h respectively have a circular flange 34 and 35 the rim of which is at a right angle bent off in the direction toward the respective oppositely located implement part and engage a shoulder 36 in the outer surface of the insulating element 3h. The insulating element 3h has its two end faces resting on the flanges 34, 35. The rectangularly bent off rim of the flanges 34, 35 has its outer surface located in the outer surface of the insulating element 3h so that within the range of the shoulder 36 no steps occur. The insulating element 3h surrounds a hollow chamber 20h which can be filled with a pressure medium through a feeding line 37 in the implement part subjected to vibrations. In the wall of the insulating element 3h there is embedded a stiffening fabric 28h which extends over the entire axial length and over the total circumference of the insulating element. In view of the stiffening fabric 28h and the variable pressure in the hollow chamber 20h, the stiffness of the insulating element can be changed.

The rectangularly bent off rims of the flanges 34e and 35e of the implement part 1e subjected to vibrations and the implement part 2e at the handle side extend partly over each other according to the embodiment of FIG. 13. The rims of the implement parts 1e and 2e which extend over each other are interconnected. The pivot-shaped implement part 1e extends into the range between the bent off rim of the implement part 2e. The flanges 34e, 35e with the bent off rims confine a hollow chamber in which the insulating element 3e is provided. The insulating element is substantially cylindrical, and the outside of the cylinder mantle 38 is coaxially arranged with regard to the axis of the implement part 1e. At half its length, the inner side of the mantle 38 has a projection 39 which extends all the way around the rim of an annular flange 40 which is located in the center between the two flanges 34e and 35e on the implement part 1e. Moreover, the two ends of the cylindrical mantle 38 rest upon those inner sides of the flanges 34e and 35e which face each other.

The two ends 41 and 42 of the cylinder mantle 38 are bent inwardly to such an extent that they engage the pivotal implement part 1e over the entire circumference. The ends 41, 42 engaged by implement part 1e extend parallel to the cylinder mantle 38, and their end faces are spaced from flange 40 and projection 39. In this way, in the sleeve two separate hollow chambers 43 and 44 are formed which are separated from each other by the flange 40 and the projection 39. These hollow chambers 43 and 44 are confined toward the outside by the cylinder mantle 38 and toward the inside by the implement part 1i and the bent-off ends 41, 42, and in axial direction by the bent-off ends 41, 42 and by the flange 40 and the projection 39. The two hollow chambers are through branch lines 45 and 46 interconnected to the conduit 37i in the implement part 1e. The pressure medium is conveyed into the hollow chambers through the conduit 37i which is controlled by means of a non-illustrated valve.

The inner sides 47 and 48 which face toward the insulating element 3i and pertain to the bent-off rims 49 and 50 of the flanges 34i, 35i are located on the mantle of a cone which opens in the direction toward the respective oppositely located implement part. The rims 49 and 50 form abutment parts against which the outside of the cylinder mantle 38 abut at a corresponding pressure in the hollow chamber 43, 44. In the position shown in FIG. 13, the hollow chambers 43, 44 are pressureless so that insulating element 3e has a softer stiffness characteristic or a softer rigidity. When the hollow chambers 43, 44 which extend in an annular way around the implement part 1i are subjected to pressure, the outside of the cylinder mantle 38 will, while the cylinder mantle correspondingly elastically deforms, engage the inner sides 47, 48 of the rims 49, 50. The greater the contacting surface between the implement part 2i and the cylinder mantle 38 of the insulating element 3i is, the greater will be the rigidity of the insulating element. Also, with this embodiment, the axial free thrust length will when increasing the pressure in the hollow chamber 43, 44 be reduced so that the rigidity increases by a corresponding degree.

With the embodiment according to FIG. 14, the implement part 2k forms a bushing which surrounds the implement part 1k in spaced relationship thereto. The insulating element 3k is arranged between the two implement parts 1k and 2k. With this embodiment, the implement part 1k has no flange. The insulating element 3k instead of having an inwardly extending projection has a projection 39k which is arranged at half the length and projects outwardly while extending all the way around. The projection 39k has an about semicircular cross section. For purposes of axially safeguarding the insulating element, the projection 39 positively extends into a depression 51 on the inside of the handle part 2k. The outside of the mantle 38k has from the projection 51 on in the direction of the two ends an increasing distance from the inner side of the implement part 2k. The ends 41k and 42k of the mantle 38k are bent in such a way that they engage the implement part 1k over the entire circumference. The insulating element 3k together with the implement part 1k confine a hollow chamber 52 which surrounds the implement part 1k and has the cross sectional shape illustrated in FIG. 14. In the implement part 1k, there is arranged the feeding line 37k for the pressure medium into the hollow chamber 52. For increasing the rigidity, the hollow chamber 52 is filled with a pressure medium in which connection the cylinder mantle 3k from the projection 39k on engages the inner wall of the implement part 2k. With increased contacting surface between the insulating element 3k and the implement part 2k, the rigidity of the insulating element increases. By means of the pressure medium which according to the previous embodiment is preferably air under pressure, the rigidity of the insulating element is set by changing the free thrust length, measured in the axial direction of the insulating element. The maximum rigidity is obtained when the cylinder mantle 38k engages the inner wall of the implement part 2k over the axial length l.

With the embodiment according to FIG. 15, corresponding to the embodiment of FIGS. 1–9A, the implement part 2l is formed by a pipe section, and the implement part 1l is formed by a pipe. Connected onto the pipe 1l is a holding member 53 which is connected to a cylinder section 54 on the pipe 1l. The cylinder section 54 merges through a flange section 55 with a further cylinder section 56 which has a greater outer and inner diameter than the cylinder section 54. On the outside of the cylinder section 56 there is a depression 57 for the insulating element 3l which is designed as a sleeve. The sleeve 31 engages the shoulder surface of the depression 57 and by means of a clamping ring 41 is clamped fast onto the pipe section 21. The sleeve 31 is cylindrical and at its inner side has a projection 39l which engages a corresponding depession on the outside of the cylinder section 56 of the holding device 53. The sleeve is secured against axial displacement by a projection 39l extending all the way around. From the projection 39l up to the end face engaging the shoulder surface of the depression 57, the sleeve 31 is fixedly connected to the holding device 53 for instance by bonding or welding. The pipe section 21 is passed from the cylinder section 56 of the holding device 53 by a distance $l_o$. This distance $l_o$ defines the free thrust length of the insulating element 3l. In the illustrated position, the insulating element 3l has lower insulating values. The pressure medium is through a non-illustrated valve introduced into the hollow chamber 20l which is defined or limited in radial direction by the pipe section 21 and by the pipe 1l and in axial direction is confined by the holding device 53 arranged within the region of the two pipe sections. With increasing pressure in the annular hollow chamber 20l, the sleeve 31 is lifted from the bottom of the depression so that the contacting surface between the sleeve 31 and the holding device 53 decreases. Correspondingly the length l increases up to a maximum value of lmax which corresponds up to the distance between the pipe section 21 and the projection 39l of the sleeve 31. When the sleeve 31 is lifted up to the projection 39l off the holding device, the insulating element 3l has its maximum rigidity. In contrast to the above described embodiments, by increasing the free thrust length, an increase in the rigidity is effected. Also in this way it is possible by means of a pressure medium, in the embodiment for example air under pressure, to change and set the rigidity of the insulating element. The possibility illustrated in FIG. 15 for setting the rigidity may also be provided in the above described embodiments. For purposes of building up or reducing the pressure in the hollow chambers, a pressure reducing valve 67 may be employed as illustrated in FIG. 16. The pressure reducing valve is built into a conduit 68 and comprises a diaphragm 69 which carries a valve 70. One end of the pressure spring 71 rests upon the valve while the other end rests against an abutment 72 of the conduit 68. The diaphragm 69 rests upon a pressure spring 73 which in its turn rests upon an adjusting spindle 74.

The conduit 68 has one end connected to a non-illustrated compressor or to the motor itself. The conduit 68 has its other end connected to the inlet valves communicating with the hollow chambers. As a result thereof, the hollow chambers can be filled with pressure medium from the compressor or directly from the motor. When connecting the conduit 68 to the motor, the combustion air escaping from the combustion chamber can be used. The pressure medium passes within the conduit 68 in the direction of the arrows 75 through a valve opening 76 and through a further opening 77. In operation, the pressure medium passes through the valve opening 76 into the diaphragm chamber 78 and through the further opening 77 into the hollow chamber confined by the insulating elements. When the pressure of the pressure medium determined by the preload of the pressure spring 73 has been obtained, the diaphragm 69 is bent downwardly whereby the valve 70 closes the valve opening 76. Depending on the selected preload of the pressure spring 73, which can be adjusted by screwing the adjusting spindle in or out, a pressure corresponding to the desired insulation will be built up in the hollow chamber. If the preload of the pressure spring 73 is low, only a slight pressure will be built up in the hollow chamber. Correspondingly, by screwing in the pressure spindle 74, the preload of the pressure spring 73 and thereby the pressure in the hollow chamber will be increased. When the pressure in the section of conduit 68 which comprises the further opening 77 drops below a corresponding value, the diaphragm 69 bends upwardly whereby the valve 70 frees the valve opening 76 so that the pressure medium can again pass through the conduit 68. In this way, the desired pressure can be set in the hollow chamber in conformity with the desired insulation value.

According to the embodiment of FIG. 17, instead of the abutment 72, a slide or valve 79 may be provided against which the pressure spring 71' rests. The slide 79 is in that region which faces away from the pressure spring connected to a centrifugal governor 80 which on both sides of the slide 79 respectively comprises two interlinked arms 81, 82, 81', 82'. The arms are respectively connected to a transverse member 83, 84. The two joints of the arms 81, 82 and 81', 82' are interconnected by a tension spring 85. When the driving motor of the implement is in its idling position, the centrifugal governor 80 turns at a low speed about its axis. The tension spring 85 pulls the two joints together whereby the slide 79 within a guiding device 86 is pressed downwardly. As a result thereof, the compression spring 71' is compressed and presses the valve 70' in the direction toward its closing position. As a result thereof, the pressure in the hollow chamber confined by the sleeves is reduced so that the rigidity of the insulating element is low. When the speed of the driving motor of the implement increases, the speed of the centrifugal governor 80 increases and the two joints of the arms 81, 82 and 81', 82' increase the distance from each other against the thrust of the tension spring 85. The slide 79 will thereby within the guiding device 86 be pulled upwardly whereby the preload of the pressure spring 71' is again eliminated. Consequently, the pressure in the hollow chamber again increases, and the rigidity or stiffness of the insulating element is increased. By means of the adjusting spindle 74', the pressure in the hollow chamber and thereby the stiffness of the insulating element is set as described in connection with FIG. 16. Depending on the preload of the pressure spring 73', the pressure in the hollow chamber can be set during the working with the implement. According to the embodiment of FIG. 17, an automatic control of the pressure in the hollow chamber is effected and thereby of the stiffness of the insulating element in conformity with the speed of the driving motor or of the centrifugal governor 80. When the driving motor is idle, the working implement does not move so that in this instance also only a slight guiding stiffness is necessary. The pressure in the hollow chamber can therefore be low or even zero. This is realized by the centrifugal governor 80. The necessary pressure in the hollow chamber during the working operation is set by setting the spindle 74'. When the speed of the driving motor increases, the preselected pressure valve is re-established in the hollow chamber and therefore the desired insulating value.

The pressure reducing valve may also be arranged at resonance areas of the working element. If larger structural elements of the tool part come into resonance, the considerable movements also move upon the implement part at the handle side. These resonance movements can be taken advantage of in order to increase the preload of the pressure spring 71, 71' and thus to reduce the pressure in the hollow chamber. When moving through the resonance range, the insulating value will then be reduced which means that a slight stiffness of the insulating element will be set. In such an instance, the considerable movements of the implement part subjected to vibrations will not, or at least only slightly, be conveyed to the implement part which is subjected to vibrations.

The stiffness of the insulating elements may also be varied by supplying heat. This can be done for instance by a heating coil while using the exhaust gases or by employing cooling liquid of the driving motor. With increasing heating up of the insulating elements, the rigidity of the insulating element is reduced. This is advantageous for instance when the working implement has to work at lower temperatures. The human organism is in cold weather even more sensitive to vibrations than at normal temperature. By turning on the heating coil, the stiffness of the insulating element can be so adjusted that the vibrations are only slightly conveyed from the implement part subjected to vibrations to the implement part at the handle side.

It is, of course, to be understood that the present invention is, by no means, limited to the specific showing in the drawings, but also comprises any modifications within the scope of the appended claims.

What I claim is:

1. A portable working implement for agriculture and forestry, especially brush cutter, which is provided with a handle intermediate its ends and includes: a cutting tool connected to one end of said implement, a motor drivingly connected to said cutting tool, a first implement part subjected to vibrations caused by the working of said motor, a second implement part arranged at the side of said handle and connected to said first implement part through the interposition of at least one elastic insulating element, and adjusting means associated with said insulating element for adjusting the rigidity characteristic of said insulating element, said insulating element being fastened on said first implement part and on said second implement part, and an abutment part surrounding said insulating element and engaged by said insulating element over different lengths in conformity with the set stiffness or rigidity.

2. A portable working implement according to claim 1, in which said adjusting means includes gas pressure operable means.

3. A portable working implement according to claim 1, in which said adjusting means includes mechanically adjustable abutment means.

4. A portable working implement according to claim 1, in which said first and second implement parts respectively include pipe sections of which said second implement part surrounds said first implement part in spaced relationship thereto, said elastic element being confined by said first and second implement parts.

5. A portable working implement according to claim 1, in which said insulating element is an elastically deformable sleeve arranged at least at one end of said second implement part, said sleeve forming part of said adjusting means and extending free in radial direction over at least a portion of its length and being operable in axial direction to close off a hollow chamber adapted to receive a pressure medium.

6. A portable working implement according to claim 1, in which said abutment part has one end of said insulating element clamped to one of said implement parts.

7. A portable working implement according to claim 1, in which said abutment part is formed by one end of said second implement part.

8. A portable working implement according to claim 1, in which said insulating element is entirely arranged in the space between said implement parts.

9. A portable working implement according to claim 1, in which said insulating element surrounds said first implement part.

10. A portable working implement according to claim 1, in which said insulating element is fastened to said first and said second implement parts and is reinforced by a carcass-like fabric within the region of its connecting points with said implement parts.

11. A portable working implement according to claim 1, in which said first and second implement parts are by said abutment part and said insulating element limited as to their abutment.

12. A portable working implement according to claim 1, in which said insulating element forms a hollow body surrounding said first implement part which is non-movably secured on said first implement part, the outside of said hollow body being spaced from its contact area with said second implement part in the direction toward the axial end of said insulating element by an increasing distance.

13. A portable working implement according to claim 1, in which said second implement part with said insulating element is shiftably journalled upon said first implement part.

14. A portable working implement for agriculture and forestry, especially brush cutter, which is provided with a handle intermediate its ends and includes: a cutting tool connected to one end of said implement, a motor drivingly connected to said cutting tool, a first implement part subjected to vibrations caused by the working of said motor, a second implement part arranged at the side of said handle and connected to said first implement part through the interposition of at least one elastic insulating element, and adjusting means associated with said insulating element for adjusting the rigidity characteristic of said insulating element, said insulating element being entirely arranged in the space between said implement parts, said insulating element having a V-shaped cross section with legs in V-shaped arrangement extending in the direction toward the respective oppositely located end of said second implement part.

15. A portable working implement for agriculture and forestry, especially brush cutter, which is provided with a handle intermediate its ends and includes: a cutting tool connected to one end of said implement, a motor drivingly connected to said cutting tool, a first implement part subjected to vibrations caused by the working of said motor, a second implement part arranged at the side of said handle and connected to said first implement part through the interposition of at least one elastic insulating element, and adjusting means associated with said insulating element for adjusting the rigidity characteristic of said insulating element, said first implement part including a pipe and a pipe section, said insulatin element being located between said pipe and said pipe section being ring formed and providing plural hollow chambers separated from each other over periphery thereof, and valve-controlled feed-line means provided for each of the hollow chambers.

16. A portable working implement according to claim 15, in which the hollow chambers are equal in size.

17. A portable working implement for agriculture and forestry, especially brush cutter, which is provided with a handle intermediate its ends and includes: a cutting tool connected to one end of said implement, a motor drivingly connected to said cutting tool, a first implement part subjected to vibrations caused by the working of said motor, a second implement part arranged at the side of said handle and connected to said first implement part through the interposition of at least one elastic insulating element, and adjusting means associated with said insulating element for adjusting the rigidity characteristic of said insulating element, said first implement part including a pipe and a pipe section, said insulating element being located between said pipe and said pipe section being ring formed and providing two axially adjoining hollow chambers separated from each other, and branch lines connected respectively to the hollow chambers.

18. A portable working implement according to claim 17, in which said insulating element has an outer side located upon a cylinder mantle, and inner sides respectively of said pipe and said pipe section extending in a diverging manner in relation to said outer side.

19. A portable working implement for agriculture and forestry, especially brush cutter, which is provided with a handle intermediate its ends and includes: a cutting tool connected to one end of said implement, a motor drivingly connected to said cutting tool, a first implement part subjected to vibrations caused by the working of said motor, a second implement part arranged at the side of said handle and connected to said first implement part through the interposition of at least one elastic insulating element, and adjusting means associated with said insulating element for adjusting the rigidity characteristic of said insulating element, said adjusting means including mechanically adjustable abutment means, said mechanically adjustable abutment means being a sleeve for adjusting stiffness characteristic, said sleeve being shiftable over said insulating element.

* * * * *

UNITED STATES PATENT AND TRADEMARK OFFICE
CERTIFICATE OF CORRECTION

PATENT NO. : 4236310
DATED : 2 December 1980
INVENTOR(S) : Erich Müller

It is certified that error appears in the above—identified patent and that said Letters Patent is hereby corrected as shown below:

[73] Assignee: Andreas Stihl, Waiblingen, Fed. Rep. of Germany

Signed and Sealed this

Thirty-first Day of March 1981

[SEAL]

Attest:

RENE D. TEGTMEYER

Attesting Officer   Acting Commissioner of Patents and Trademarks